Dec. 9, 1958

A. SCHEUNERT 2,863,947

TELEPHONE SYSTEM WITH LOCAL AND TOLL CALL SWITCHING OVER IDENTICAL CONNECTORS

Filed June 21, 1956

2 Sheets-Sheet 1

Inventor:
Alfred Scheunert.

By. [signature] Atty.

Dec. 9, 1958

A. SCHEUNERT 2,863,947

TELEPHONE SYSTEM WITH LOCAL AND TOLL CALL SWITCHING OVER IDENTICAL CONNECTORS

Filed June 21, 1956

2 Sheets-Sheet 2

Inventor:
Alfred Scheunert

By [signature] Att'y.

United States Patent Office 2,863,947

Patented Dec. 9, 1958

2,863,947

TELEPHONE SYSTEM WITH LOCAL AND TOLL CALL SWITCHING OVER IDENTICAL CONNECTORS

Alfred Scheunert, Berlin-Siemensstadt, Germany, assignor to Siemens & Halske Aktiengesellschaft, Berlin and Munich, a corporation of Germany Application June 21, 1956, Serial No. 592,791

Claims priority, application Germany June 30, 1955

14 Claims. (Cl. 179—18)

This invention is concerned with a telephone system comprising a circuit arrangement for extending local calls and toll calls over the identical connector.

The potential for maintaining a connection is placed in a connector on the incoming private conductor. In the case of a toll call extended by a connector, the release is to depend not upon the called subscriber but exclusively upon the toll operator. It is accordingly necessary in such cases, in which the holding or busy potential is connected at a point preceding the connector, to disconnect such potential from the private conductor of the connector. In order to carry out such disconnection of the potential, it has been proposed to carry to the connector in addition to the line conductors and the usual private conductor, a further auxiliary control conductor. Accordingly, at least those of the selectors which precede the local-toll connector, and over which toll calls are to be extended, must be equipped with special wipers for controlling the switching of the special auxiliary control conductor.

The present invention shows a way for disconnecting the holding or busy potential in the connector from the incoming private conductor without employing a special auxiliary control conductor. This object is realized by the use of a control relay which is affected over a line conductor upon setting of the connector to extend a toll call, to disconnect from the incoming private conductor the busy or holding potential which is connected thereto upon initial seizure of the connector.

In accordance with another object and feature of the invention, the control relay is operatively affected by a switching operation under control of the exchange operator to cause restoration of a relay which controls the connection of the busy potential.

The windings of the line relay connected to the incoming line conductors of the connector are in the case of local calls disposed in a circuit extending over the subscriber's line loop; in the case of toll calls, two circuits are completed over the line conductors. A winding of the line relay is disposed in each of these circuits. Upon disconnection of the potential from one line conductor, responsive to setting of the connector in local calls, and consequent release of the line relay, the switching-in of the auxiliary relay is prevented. In the case of a toll call, the line relay is maintained energized in a circuit extending over the other line conductor, thereby operatively affecting the auxiliary control relay for disconnecting the potential from the first named line conductor. The auxiliary relay thereupon effects actuation of the control relay.

Figure 1:
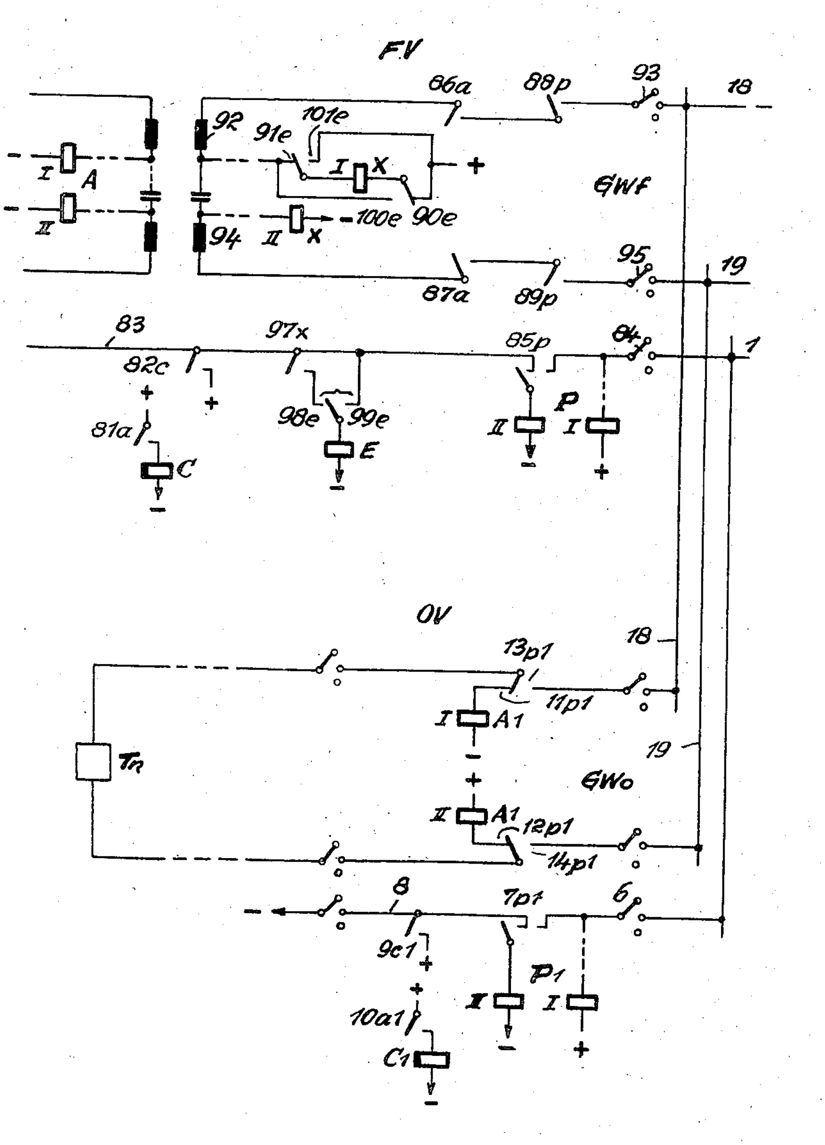

The foregoing and other objects and features will appear from the description of an embodiment of the invention which is rendered below with reference to the accompanying drawings. In these drawings, showing only the switching means and circuits required for an understanding of the invention, Fig. 1 shows relays of a group selector switch GW*o* disposed in the local connection path OV, and relays of a group selector switch GW*f* disposed in the toll connection path FV; and Fig. 2 illustrates the circuit of the connector.

When the connector is idle, negative potential will be connected to the incoming private conductor 1 by way of contacts 2*c*2, 3*k*, 4*p*2, 5*b*. The contact 3*k*, as well as other *k*-contacts, are in the illustrated positions only when the connector is in normal position. All the *k*-contacts are placed in alternate position (opened or closed, respectively) as soon as the connector, which may be of the vertical-rotary type, leaves its normal position, such *k*-contacts accordingly constituting vertical off-normal contacts. Contacts designated by *w* are rotary off-normal contacts, that is, they are actuated when the connector wipers execute the first rotary step.

*A. Extension of a local call*

Figure 2:
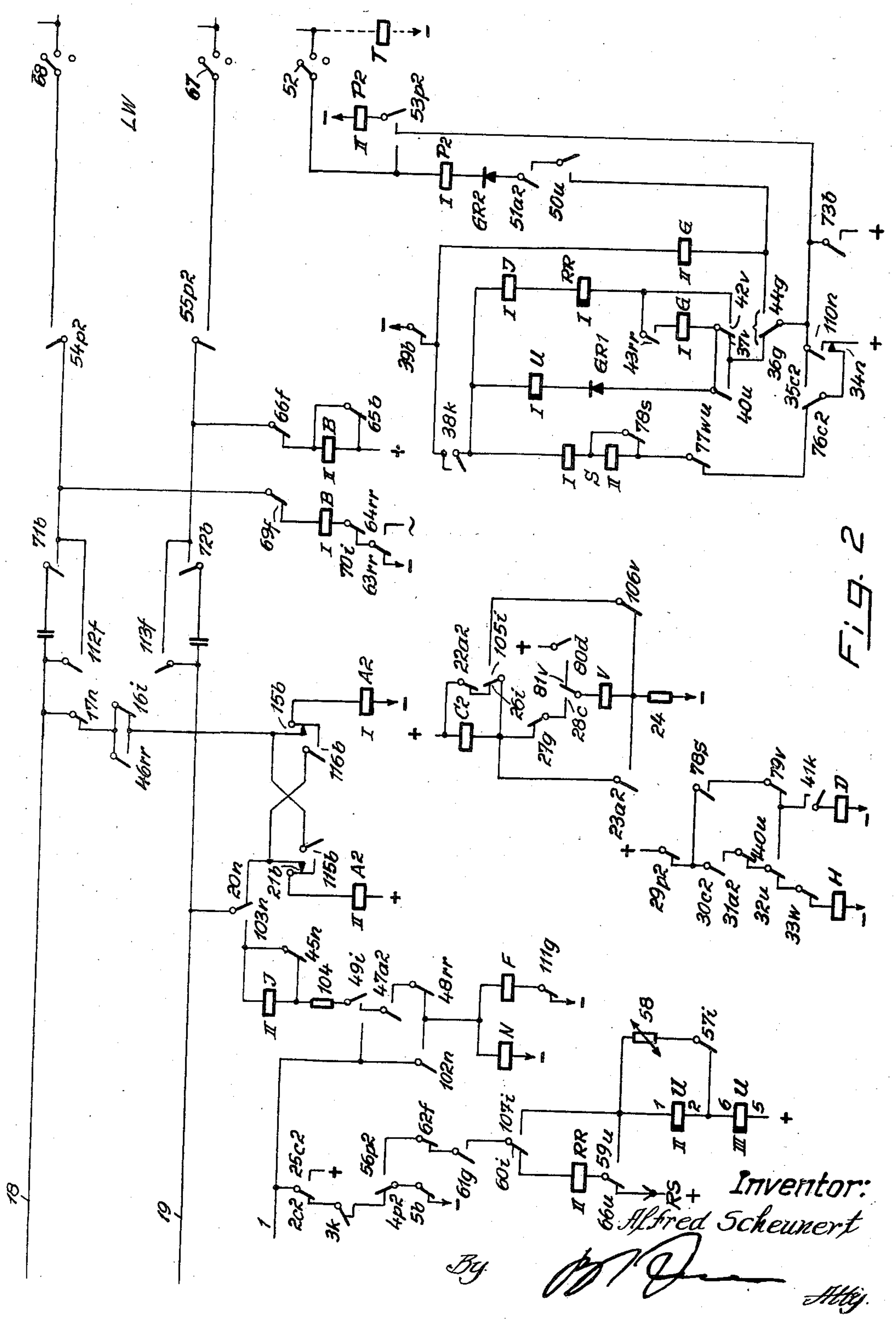

When the private or test wiper 6 of a group selector GW*o*, hunting for an idle connector, engages the bank contact connected with the private conductor 1 of the connector Fig. 2, such connector being assumed to be idle, the test relay P1 will energize and will stop the hunting operation of the group selector in known manner, at the same time closing its contacts **7*p*1. Positive busy potential is connected over contact 9*c*1, controlled by relay C1 to the private conductor 8 which is multipled with like conductors of a group of selectors. Relay C1 is a slow-to-release relay which is energized upon seizure of the group selector in a circuit over contact 10*a*1 of the line relay A1. The holding winding II of relay P1 receives current in a circuit over contact 9*c*1 of relay C1. Contacts 11*p*1 and 12*p*1 of relay P1 are opened to disconnect the windings I and II of line relay A1; the line conductors are connected through at contacts 13*p*1 and 14*p*1**. The calling subscriber is now connected through to the connector (Fig. 2) and receives battery feed current over the windings I and II of the line relay A2 which energizes in the calling party's loop circuit. Relay A1 in the preceding group selector GW*o* (Fig. 1) upon restoring opens its contact **10*a*1 and relay C1 deenergizes with some delay, opening contact 9*c*1 to disconnect busy potential after busy potential has been connected to the private conductor in the connector. The energizing circuit for the line relay A2 in the connector extends over a path (1) —, winding I of relay A2, 15*b*, 16*i*, 17*n*, line conductor 18**, GW*o*, **13*p*1** . . . calling station T*n* . . . **14*p*1**, GW*o*, line conductor 19, **20*n*, 21*b***, winding II of relay A2, +

Relay C2 energizes responsive to opening of contact **22*a*2 and closing of contact 23*a*2, in a circuit (2) +, C2, 23*a*2, resistor 24**, —.

Relay C2 upon energizing actuates among others its contact **2*c*2, opening such contact to remove negative potential from the private conductor 1 and connecting to such conductor positive potential over contact 25*c*2** to mark the connector as being busy. This positive busy potential is extended back to the holding winding II of relay P1 in the group selector GW*o* and over private conductor 8 to the switches preceding the group selector.

When the calling subscriber T*n* transmits the dial impulse series for the vertical setting of the connector, the line relay A2 will impulsewise deenergize. Control relay V and the vertical magnet H of the connector will be actuated in circuits (3) +, **22*a*2, 26*i*, 27*g*, 28*c*, V, resistor 24**, —; and
(4) +, **29*p*2, 30*c*2, 31*a*2, 32*u*, 33*w***, H, —.

Relays C and V remain during the pulsewise actuation of contacts **22*a*2 and 23*a*2 in known manner operated. Upon conclusion of the impulse series, relay V restores because contact 23*a*2 remains closed for a longer interval. Relay U is now actuated over its winding I in a circuit (5) +, 34***n*, 35*c*2, 36*g*, 37*v*, GR1, I U, 38*k*, 39*b*, —.

Contact 37*v* is bridged at contact 40*u* and relay U is accordingly held actuated during the receipt of the next following impulse series transmitted by the calling party. The rotary magnet D is now actuated in a circuit (6) +, 29*p*2, 30*c*2, 31*a*2, 140*u*, 41*k*, D, —.

Relays RR and J energize at the same time over their windings I in a circuit.

(7) +, 34*n*, 35*c*2, 36*g*, 40*u*, 42*v*, I RR, I J, 38*k*, 39*b*, —.

Winding I of relay G is connected at contact 43*rr* but but such winding is short-circuited during this impulse series by contact 42*v*. Upon termination of the impulse series and opening of contact 42*v*, relay winding IG is connected in the circuit "7." Relay G energizes and closes over its winding II a holding circuit (8) +, 34*n*, 35*c*2, 44*g*, II G, 39*b*, —.

Winding II of relay J, which energized over its winding I in the circuit "7," is short-circuited over contact 45*n*. Relay J is slower to operate and slower to release than relay RR so that contact 46*rr* of RR closes before contact 16*i* opens. The circuit "7" is interrupted at contact 36*g* upon energization of relay G and relay RR will accordingly restore faster than relay J. The result is that the battery feed over relay A2 is temporarily interrupted. Relay A2 opens its contact 47*a*2. Relay N which initiates certain operations incident to the extension of a toll call to be presently explained, cannot energize responsive to closure of contact 48*rr* with contact 49*i* in closed position, due to the temporary opening of contact 47*a*2. Contact 26*i* being still open prevents short-circuiting of relay C2. Upon reclosure of contact 16*i* responsive to release of relay J, relay A2 will energize again and will open its contact 22*a*2. In the brief interval of closure of the two contacts 22*a*2 and 26*i*, the relay C2 cannot restore, remaining actuated as during the receipt of the impulse series.

After closure of contact 44*g*, during the release interval of realy RR, that is, before relay A2 is temporarily released, there is closed the test circuit (9) +, 34*n*, 35*c*2, 44*g*, 50*u*, 51*a*2, GR2, I P2, wiper 52 . . . T, —.

If the called subscriber station is idle, test relay P2 will energize, closing its contact 53*p*2 and thereby connecting the positive potential from contacts 34*n* and 35*c*2 as a busy potential to the wiper 52 and consequently to the test or private conductor of the seized line. The holding winding II of relay P2 is switched in at the same time. The line conductors are extended at contacts 54*p*2 and 55*p*2. Contact 29*p*2 opens to remove positive potential from the circuits of the vertical and rotary magnets H and D. Closure of contact 56*p*2 initiates the ringing of the called subscriber line. The first ring is transmitted while relay U whose circuit was interrupted at contact 36*g* is still in attracted position. Relay RR energizes in a circuit (10)

$$+, \text{III U}, \frac{\text{II U}}{57i,\ 58}, 59u, \text{II RR}, 60i, 61g, 62f, 56p2, 5b$$

Upon energizing, relay RR opens contact 66*rr* and closes contact 64*rr* to connect the ringing source to the called line by way of winding I of the battery feed relay B. This relay does not energize responsive to the alternating ringing current because its winding II is short-circuited over contact 65*b*.

Winding III U opposes winding II U, as indicated by the numerals at the coil terminals. The release time of the relay U is controlled by a thermistor 58 connected in parallel to winding II U. When relay U releases, contact 59*u* will open. Relay RR deenergizes, terminating the first ring. Upon closure of contact 66*u*, the winding II of relay RR will be connected to a ringing switch RS which connects positive potential in predetermined intervals, for example, 5 or 10 seconds. Relay RR is correspondingly energized and effects continuation of the ringing.

If the called party answers during a ringing pause, relay B will be energized over the called subscriber loop in a circuit

(11) +, 65*b*, 66*f*, 55*p*2, wiper 67, subscriber loop, wiper 68, 54*p*2, 69*f*, I B, 70*i*, 66*rr*, —.

The line conductors are extended at contacts 71*b* and 72*b*. Opening of contact 5*b* and subsequent opening of contact 61*g* prevents renewed connection of the ringing relay RR. At contact 39*b*, the holding circuit "8" for relay G is interrupted and relay G releases. At contact 73*b*, busy potential is connected to the private conductor of the called line independent of contacts 34*n* and 35*c*2. The release of the connector is thus made dependent upon the hanging up of both parties to the call. Closure of contacts 115*b* and 116*b* and subsequent opening of contacts 21*b* and 15*b* reverses the current flow in the battery feed circuit to the calling line, for example, for initiating in known manner metering of the call.

Assuming that the calling party hangs up first. Relay A2 will restore. Relay C2 is now short-circuited over contacts 22*a*2 and 26*i* and releases likewise. When the called party hangs up, relay B will release. At contact 73*b*, the positive busy potential is disconnected from the wiper 52 and winding II of relay P2, and P2 restores. Relay S energizes now in a circuit

(12) + 34*n*, 76*c*2, 77*wu*, 78*s*, winding I of S, 38*k*, 39*b*, —.

The rotary magnet D is now connected in a circuit

(13) + 29*c*2, 78*s*, 79*v*, 41*k*, D, —.

Relay V energizes in a circuit

(14) +, 80*d*, 81*v*, V, resistor 24, —.

Circuit "13" is interrupted at contact 79*v*. The rotary magnet D deenergizes and interrupts circuit "14." Relay V deenergizes, etc., etc. When the wipers of the connector leave the last bank contacts of the corresponding level to which they had been set, the rotary off-normal contact 77*wu* will open. Circuit "12" is now interrupted. Relay S releases and prevents renewed closure of circuit "13." The connector resumes normal position. All off-normal contacts *k*, *w* and *wu* assume the normal positions in which they are shown. Off-normal contact 3*k* being now closed, the connector is ready to serve another call.

*B. Extension of a toll call*

When the group selector GW*f* (Fig. 1) is seized, the line relay A will energize and actuate its contact 81*a* to close an energizing circuit for relay C. Relay C upon energizing connects busy potential to the private conductor 83 over its contact 82*c*. After setting of the group selector WGf, the test relay P will energize over its winding I in circuit

(15) +, I P . . . wiper 84, private conductor 1, over to Fig. 2, 2*c*2, 3*k*, 4*p*2, 5*b*, —.

Upon closure of contacts 85*p*, the holding winding II P (Fig. 1) will receive positive potential over contact 82*c*. This positive potential is simultaneously placed on the private conductor 1 ahead of the connector and remains connected thereto for the duration of a toll call, while in a local call the positive potential connected at contact 91*c*1 is as previously explained disconnected upon the release of relay C1 responsive to deenergization of relay A1. The release of the group selector and the seized connector are in this manner made dependent on the toll operator.

The line conductors of the group selector GWf (Fig. 1) are now connected through to the connector (Fig. 2) over contacts 86a, 87a and 88p, 89p, and relay A2 in the connector operates in circuits

(16) +, 90e (Fig. 1), winding I of relay X, 91e, 92, 86a, 88p, wiper 93, line conductor 18 to Fig. 2, 17n, 16i, 15b, winding I of relay A2, —; and

(17) —, winding II of X (Fig. 1), 94, 87a, 89p, wiper 95, line conductor 19 to Fig. 2, 20n, 21b, winding II of A2, +.

Relay X is a differential relay and does not energize responsive to current flow over both of its windings I and II. Relay C2 in the connector Fig. 2 energizes responsive to operation of relay A2 as described before in connection with the local call, and prepares for the setting of the connector.

Impulses transmitted by the toll operator for setting the connector affect the line or impulse relay A (Fig. 1) which opens its contacts 86a and 87a, thereby interrupting the circuits "16" and "17" for the energization of windings I and II of relay A2 of the connector. Relay A2 accordingly deenergizes. Upon conclusion of the impulse series for the vertical setting operation of the connector (vertical magnet H), relay U will energize in circuit "5." The next impulse series transmitted by the toll operator actuates the rotary magnet D. Circuit "7" extending over the winding I of relay RR and over relay J is interrupted at contact 36g upon energization of relay G, relay RR releasing, and both contacts 16i and 46rr are open during the release interval of relay J. Circuit "17" remains closed. Relay A2 is held operated in circuit "17" over its winding II, and relay X (Fig. 1), being now energized only over its winding II, attracts its armature. Relay E (Fig. 1) energizes in a circuit

(18) +, 82c, 97x, 98e, E, —.

Relay E closes its contact 99e, thereby connecting its winding to private conductor 83 independent of contact 97x, also opening its contact 98e and closing contacts 100e and 101e. Contacts 90e and 91e are opened. The winding I of relay X is now connected so that it can subsequently serve as a battery feed relay for the called subscriber, with current flow over its windings in identical direction.

In the connector, the release of relay A2 is prevented and relay N accordingly energizes after release of relay RR, in a circuit

(19) +, 25c2, 49i, 47a2, 48rr, N, —.

Relay N closes contact 102n which bridges contacts 48rr, 47a2, 49i. Relay N also opens contacts 17n, 20n, 34n, 45n and closes contacts 103n and 110n. Contact 110n is closed before contact 34n is opened. Opening of contact 17n disconnects potential from the line conductor 18. The winding II of A2 is disconnected and winding II of relay J is connected to the line conductor 19 in a circuit

(20) +, 25c2, 49i, resistor 104, winding II of J, 103n, 19, 95, 89p, 87a, 94, winding II of X, —.

The resistor 104 is of such magnitude that relay X restores in the circuit "20." Relay J remains operated. Relay C2 is now connected in a circuit

(21) +, C2, 105i, 106v, resistor 24, —.

Contact 70i in the circuit of winding I of B is open and contact 57i is likewise open. The thermistor 58 is disconnected from its parallel connection with winding II of U. Contact 107i upon closing completes for relay U a circuit

(22) +, III U, II U, 107i, 61g, 62f, 56p2, 5b, —.

The windings II and III of relay U are dimensioned so that relay U remains actuated in the circuit "22," a current flowing through winding II which is stronger than the current flowing through winding III.

The ringing of the selected subscriber station is under control of the toll operator who transmits a ringing signal, for example, a current impulse. The circuit "20" is interrupted at contact 87a upon release of relay A (Fig. 1). Relay J (Fig. 2) deenergizes. Circuit "10" is now closed and the first ring is transmitted. Relay U releases because the opposing winding III U can become effective due to the reconnection of the thermistor 58 at contact 57i, and the ring relay RR is consequently connected to the ringing switch or ringing interrupter RS. The ringing continues under control of the ringing interrupter. Release of relay J causes release of relay C2 because its winding is now short-circuited over contacts 22a2 and 26i. The positive busy potential is disconnected from the private conductor 1 due to opening of contact 25c2. The auxiliary relay N receives positive potential over contact 82c in the group selector GWf, Fig. 1.

Accordingly, in the case of a toll connection, the positive holding or busy potential is disconnected in the connector. It may be mentioned also that relay N, upon energizing, has connected positive potential to the wiper 52 and the holding winding II of relay $P_2$ over its closed contact 110n, independent of contact 35c2. Contact 34n is opened upon closure of contact 110n.

When the called party answers during a ringing pause, the battery feed relay B will energize. Circuit "8" is interrupted at contact 39b. Relay G releases. Relay F is connected over contact 111g parallel to relay N and both are connected to the private conductor 1 over contact 102n, relay F also energizing. At contacts 66f and 69f, the battery feed relay B is disconnected. At contacts 112f and 113f, the line conductors are switched through. The called party receives battery feed over relay X, Fig. 1. An answer signal is in suitable, not illustrated manner transmitted to the exchange operator.

The release of the connection is initated after hanging up of the called party and consequent restoration of relay X (Fig. 1), by opening of the loop at the toll board or by a repeater disposed ahead of the group selector GWf. Relay C deenergizes and disconnects the holding or busy potential from the private conductor 83 which is extended to the private conductor 1. Relays N and F in the connector deenergize. Relay P2 restores upon opening of contact 110n. Closure of contact 29c2 initiates the previously described restoring operations of the connector.

Changes may be made within the scope and spirit of the appended claims.

I claim:

1. A telephone system having a connector for extending local calls and also toll calls, said connector comprising line conductors and a private conductor, switching means for seizing said connector over said conductors to extend local and toll calls, respectively, a potential being required on said private conductor to maintain a connection extended over said connector, and a circuit arrangement for controlling the connection of said potential, said arrangement comprising relay means in said connector for connecting said potential to said private conductor upon seizure of said connector, a control relay, means for energizing said control relay over one of said line conductors only upon extending a toll call, means governed by said control relay for disconnecting said potential from said private conductor in said connector, and means disposed in a switching device preceding said connector to connect said potential to said private conductor.

2. A system and circuit arrangement according to claim 1, comprising operator-controlled circuit means for effecting the operation of said control relay, and means controlled by said control relay for disconnecting said relay means.

3. A system and circuit arrangement according to claim 2, comprising a line relay in said connector, said line relay having two windings, means for connecting each of said windings with one of said line conductors, circuit means effective in local calls for connecting said windings in the loop circuit of a calling local station, means effective in a toll call for connecting each of said windings in an individual circuit over the respective line conductors, an auxiliary relay, means effective in a local call for interrupting one of said individual circuits to release said line relay for preventing energization of said auxiliary relay, and means effective in a toll call for maintaining said line relay actuated to secure the operative actuation of said auxiliary relay.

4. A system and circuit arrangement according to claim 3, comprising contact means governed by said auxiliary relay for respectively disconnecting a potential from one of said line conductors while disconnecting one winding of the line relay from the other line conductor.

5. A system and circuit arrangement according to claim 3, comprising a differential relay having two windings, said differential relay being disposed at a point of the connecting path for a toll call which is ahead of said connector, means for connecting the windings of said differential relay respectively in circuit with the windings of said line relay, an auxiliary relay also disposed ahead of said connector, said differential relay operating upon interruption of the circuit over one of said line conductors to actuate said auxiliary relay, and contact means controlled by said auxiliary relay for switching the circuit of one winding of said differential relay so as to connect said differential relay to operate upon completion of a toll connection as a battery feed relay for the called station.

6. A system and circuit arrangement according to claim 3, comprising a control relay, means for energizing said control relay in a local circuit upon setting of said connector, means governed by said control relay for energizing said auxiliary relay, and means controlled by said auxiliary relay for connecting said control relay in circuit with one of said line conductors.

7. A system and circuit arrangement according to claim 4, comprising a control relay, means for energizing said control relay in a local circuit upon setting of said connector, means governed by said control relay for energizing said auxiliary relay, and means controlled by said auxiliary relay for connecting said control relay in circuit with one of said line conductors.

8. A system and circuit arrangement according to claim 6, comprising a differential relay disposed at a point of the connecting path ahead of said connector over which toll calls are extended, means for connecting one winding of said differential relay over one of said line conductors in series with a winding of said control relay in said connector, and resistance means connected in series with said control relay to cause deenergization of said differential relay.

9. A system and circuit arrangement according to claim 6, comprising ring control means, and contact means governed by said control relay for disconnecting said ring control means.

10. A system and circuit arrangement according to claim 9, comprising operator controlled means for interrupting the circuit of said control relay to reconnect said ring control means for the purpose of transmitting ringing current to the called subscriber.

11. A system and circuit arrangement according to claim 10, comprising a relay for connecting busy potential to the private conductor of said connector, and contact means controlled by said line relay and said control relay in said connector for short-circuiting the winding of said relay to cause deenergization thereof and consequent disconnection of said busy potential.

12. A system and circuit arrangement according to claim 6, comprising contact means actuated by said auxiliary relay for connecting its winding in a holding circuit over the incoming private conductor.

13. A system and circuit arrangement according to claim 7, comprising contact means actuated by said auxiliary relay for connecting its winding in a holding circuit over the incoming private conductor.

14. A system and circuit arrangement according to claim 12, comprising a further auxiliary relay, means for energizing said further relay responsive to answering of the called subscriber, and contact means actuated by said further relay for disconnecting the battery feed relay for called subscribers in local calls and for connecting the line conductors through to the subscriber called in a toll call.

References Cited in the file of this patent

UNITED STATES PATENTS

| | | |
|---|---|---|
| 1,757,101 | Tharp | May 6, 1930 |
| 2,481,932 | Kille et al. | Sept. 13, 1949 |
| 2,686,223 | Powell | Aug. 10, 1954 |